US011454196B1

(12) United States Patent
Brown

(10) Patent No.: US 11,454,196 B1
(45) Date of Patent: Sep. 27, 2022

(54) FUEL BOWL

(76) Inventor: Steven Brown, Moore, OK (US)

(*) Notice: Subject to any disclaimer, the term of this patent is extended or adjusted under 35 U.S.C. 154(b) by 0 days.

(21) Appl. No.: 12/150,765

(22) Filed: Apr. 30, 2008

(51) Int. Cl.
*F02M 21/04* (2006.01)
*F02M 21/02* (2006.01)

(52) U.S. Cl.
CPC ...... *F02M 21/047* (2013.01); *F02M 21/0239* (2013.01); *F02M 21/0284* (2013.01); *Y02T 10/30* (2013.01); *Y10T 137/87587* (2015.04); *Y10T 137/87619* (2015.04)

(58) Field of Classification Search
CPC .......... F02M 21/0212; F02M 21/0239; F02M 21/0242; F02M 21/047; Y10T 137/87587
USPC .......... 137/599.03, 888, 892; 261/23.1, 23.2, 261/118, 119.2
See application file for complete search history.

(56) References Cited

U.S. PATENT DOCUMENTS

| | | | |
|---|---|---|---|
| 1,733,730 A | 10/1929 | Haling | |
| 2,965,462 A * | 12/1960 | Smith et al. | 48/180.1 |
| 3,186,692 A * | 6/1965 | Moseley | 261/39.3 |
| 3,319,944 A | 5/1967 | Brenneman | |
| 3,372,912 A * | 3/1968 | Benmore | 261/36.2 |
| 3,575,390 A * | 4/1971 | Bickhaus | F02M 7/12 261/41.5 |
| 3,828,747 A * | 8/1974 | Nambu | F02M 31/163 123/547 |
| 3,843,338 A | 10/1974 | Zonker et al. | |
| 3,898,308 A | 8/1975 | Baum | |
| 4,044,077 A | 8/1977 | Gupta | |
| 4,357,283 A * | 11/1982 | Manning | 261/23.2 |
| 4,375,438 A * | 3/1983 | McKay | 261/23.2 |
| 4,387,685 A * | 6/1983 | Abbey | 123/439 |
| 4,836,506 A * | 6/1989 | Hundertmark | 261/23.2 |
| 5,667,730 A * | 9/1997 | Barfield | 261/18.3 |
| 5,863,470 A * | 1/1999 | Grant | 261/23.2 |
| 6,120,007 A * | 9/2000 | Grant | 261/23.2 |
| 6,290,215 B1 | 9/2001 | Pinsker | |
| 6,481,698 B1 * | 11/2002 | Calvin et al. | 261/23.2 |
| 6,623,154 B1 | 9/2003 | Garcia | |
| 6,701,960 B1 | 3/2004 | Stark et al. | |

OTHER PUBLICATIONS

Honda Power Product Parts Catalogue 4, 2005, p. 48.
Beam Products Mfg Co., Beam Carburetion Catalog, Jan. 1984, 14 pages, Rosslyn Street Los Angeles CA, 90065.
Carburetion & Turbo Systems, Inc., Carburetion & Turbo Systems, Inc., 1897 Eagle Creek Boulevard, Shakopee, MN 55379-2703, 1999 Product Catalog.

* cited by examiner

*Primary Examiner* — Kevin F Murphy
(74) *Attorney, Agent, or Firm* — Steven M. McHugh; TCORS

(57) ABSTRACT

A fuel bowl is disclosed. The fuel bowl comprises a body having an interior opposite an exterior, four sides, and a bottom opposite an opening. The opening is configured to be in fluid communication with a carburetor or an adaptor. The fuel bowl also comprises a fuel inlet port disposed in at least one of the four sides and configured to receive a gaseous fuel from a fuel regulator. The gaseous fuel expands and contracts within the body. A carburetor system is also disclosed. The carburetor system comprises a gaseous fuel, a fuel regulator configured to receive and deliver the gaseous fuel, a fuel bowl in fluid communication with the fuel regulator and a carburetor, a final fuel metering restriction disposed in an inlet supply port of a cylinder of the carburetor, and a venturi disposed in the carburetor.

37 Claims, 11 Drawing Sheets

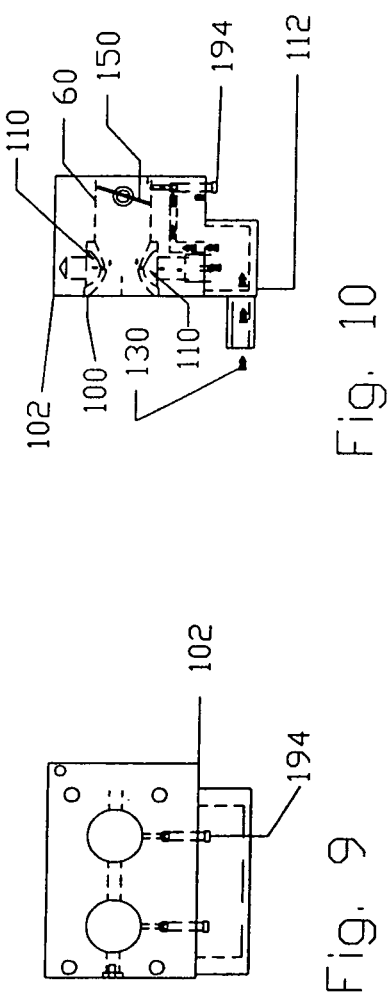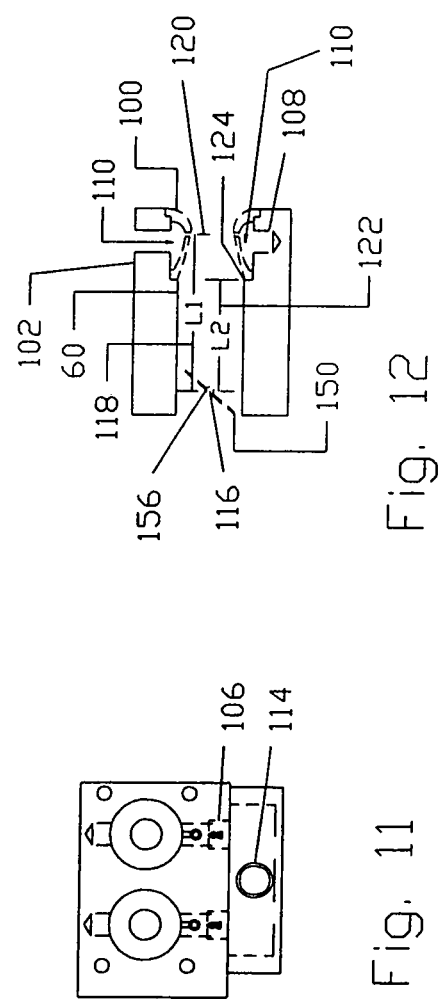

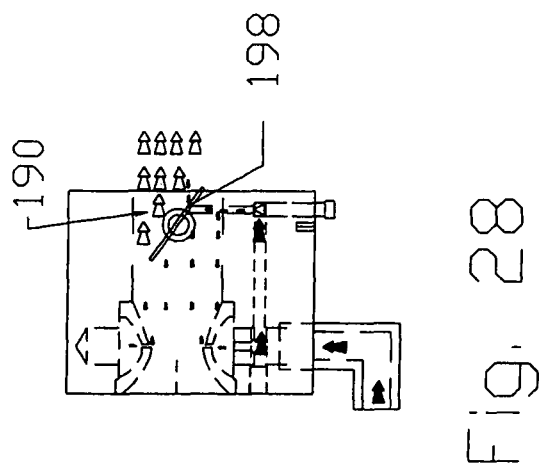
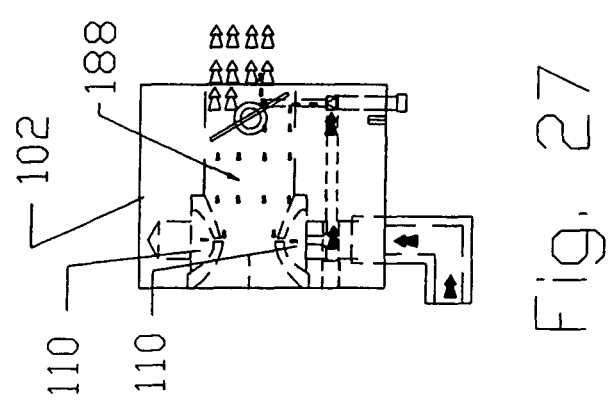

FUEL BOWL

PRIORITY CLAIM

This Application is a continuation-in-part of and claims priority to application Ser. No. 10/884,781 entitled "Fuel Conversion Device" filed on Jul. 2, 2004.

BACKGROUND

The present disclosure relates to a gaseous fuel conversion device, and particularly to a gaseous fuel venturi configured to increase power and reduce unwanted emissions of internal combustion engines.

A venturi is used to mix a gaseous fuel, with air, for combustion in an internal combustion engine. This is done, by placing a restriction in the airflow that creates increased air velocity until the restriction is reduced. As the restriction is reduced, a vacuum (i.e., a low-pressure area) is created that is used to draw fuel into the carburetor.

In gaseous fuel venturi type systems, fuel is commonly drawn into the engine by using a spud tube installed in a gasoline carburetor body, a carburetor adaptor placed between the existing carburetor and the air cleaner or by replacing the gasoline carburetor with a whole gaseous fuel carburetor. The venturi is contained within a carburetor or carburetor adapter body. Typically, the spud tube relies on the venturi profile built into the existing gasoline carburetor. Vacuum, created by the airflow through the venturi, draws on the tube to supply fuel similar to a gasoline carburetor design. Carburetors and carburetor adapters commonly use a removable or changeable venturi so that the same body can accommodate different engines, matching venturi size with engine size and fuel type. Airflow and vacuum are used in a similar manner as with a spud tube, but fuel is typically drawn into the system through slots or holes. Venturis in carburetors and carburetor adaptors can be specifically designed for gaseous fuel.

Conventional removable-changeable venturis are typically shaped like an hourglass, as illustrated in prior art FIG. 1. The fuel is supplied to the venturi, through the orifice or load block, by the fuel regulator. As suction from the venturi reaches the fuel regulator, a diaphragm moves. As the diaphragm moves, it actuates a valve that allows fuel to flow to the venturi, through the orifice or load block. Since the pressure from the fuel in the regulator is offset by the suction of the venturi, there is very little vacuum or zero pressure in the hose between the regulator and the carburetor or adapter. Regulators are often fitted with a primer button. This is used to force fuel into the carburetion system to aid in starting. Regulators may also be fitted with an idle circuit that can also be used to aid in cold starts since they force fuel into the carburetion system as well. When used to aid in starting, the primer button is depressed, pushing on the regulator's diaphragm. The diaphragm connects to the regulator's fuel valve, so as the diaphragm moves, fuel is released and delivered to the venturi.

Common venturi systems include a spud, an adaptor, and a carburetor. A spud tube replaces the existing main jet in a gasoline carburetor. Because the "built-in" venturi is designed to work with gasoline, it does not mix air and gaseous fuels properly throughout the entire engine's operating range. The average gasoline carburetor's venturi is designed to create a little turbulence that "helps" gasoline to atomize. Such turbulence in the airflow is counterproductive in gaseous fuel carburetion systems since the gas is a vapor already. Such disruptions in the airflow cause the spud tube to be a very inefficient system for mixing air and fuel. The inconsistent fuel delivery of the spud tube causes loss of power and varying emission levels throughout the operating curve. Hard starting and power losses over about 50% are common with spuds when compared with the same engine operating on gasoline. Spuds have been popular because of low cost, but are time consuming to install.

Adapters place a venturi, contained in the adapter body, between the carburetor and the air cleaner. The gasoline carburetor's throttle is still used. While adapters are vastly superior to the spud tube, the venturi shape and sizing can radically alter the performance of the engine and fuel delivery. The main disadvantage, with an adapter, is its usual proximity to the gasoline carburetor's venturi. This second venturi can cause some airflow disruptions resulting in some loss of power.

Among venturi type systems, carburetors offer the best performance since there is no restriction from another venturi and the venturi/carburetor body can be specifically designed for the fuel and engine application. However, the distance between the venturi and throttle location is critical. If the venturi is too close to the throttle, the air/fuel mix does not have time to blend properly before hitting the throttle valve (i.e., butterfly). With replacement carburetors, the distance between venturi and throttle is limited because the gasoline carburetor being replaced usually determines gaseous fuel carburetor length. Yet, it is quite common, on many carburetor designs, for the venturi to be placed further in the throat closer to the throttle since most manufacturers design a standard "carburetor body" that is fitted to each application. This throttle/venturi body is commonly fitted between flange adapters for the inlet and outlet of the carburetor.

Multi cylinder engines present special problems regarding emissions. Engines, with two or more cylinders and a single barrel carburetor, have difficulty in balancing the emissions between cylinders. As emission requirements tighten, it is important that each cylinder have similar emissions numbers. If emissions are not balanced, then one or more cylinders must run too lean to compensate for others that are too rich, so that the lowest overall emissions levels can be achieved. The difference in emission levels between cylinders is the result of a common intake manifold, cam profile, and valve timing. As one cylinder takes in fuel, the other cylinder may still be drawing fuel into its combustion chamber at the same time. This is caused by valve overlap and cam profile. Much of this excess fuel does not completely combust and contributes to higher emissions.

The common solution, to emissions variance between cylinders, is to have an individual barrel/venturi/manifold inlet for each cylinder (e.g., a two-cylinder engine would have a two-barrel carburetor). On a gasoline carburetor, both barrels share a common fuel bowl. This does not contribute to problem of emissions variance since each cylinder's main jet meters out the fuel and the gasoline is only drawn into the cylinder when venturi suction occurs. Common to most new multi-barrel carburetor designs, both throttle lever butterfly valves share a common adjustment, but each barrel can have its own idle circuit mixture. However, when operating on gaseous fuel a common fuel inlet into the carburetor or adapter, for a multi cylinder carburetion system (e.g., a two-barrel carburetor) is just about the same as having a single barrel carburetor since both cylinders draw from a single source. The fuel regulator can also contribute to variances in cylinder emissions. Most modern two cylinder engines, for example, have an "intake, intake, exhaust, exhaust" not "intake, exhaust, intake, exhaust" stroke pattern. While the first cylinder takes in fuel, the gaseous fuel regulator's diaphragm/fuel valve has not yet retracted before the second cylinder takes in fuel. The fuel valve remains partially open. The result is an extra rich intake stroke for the second cylinder. Even at idle this is a concern since the regulator's internal idle circuit delivers pressurized fuel at low speeds with the same result. Existing gaseous fuel carburetor designs (venturi and non-venturi types), both single barrel and multi-barrel, may have an idle circuit by-pass that supplies fuel between the fuel inlet port and the load-block or metering valve. In such designs, all cylinders share the same air fuel mixture for idle, so the single adjustment does not address idle circuit related emissions variance. Also common to existing multi-cylinder carburetion designs is a common fuel inlet port to the carburetor, or carburetor adapter, which supplies fuel to all cylinders. Because of these challenges, each cylinder needs its own metered fuel mixture.

There are several challenges not addressed by current venturi style conversion systems. These challenges include current spud tube, adapter, carburetor and venturi designs, which rob too much power from the engine because of inefficient airflow designs. These inefficiencies also produce inconsistencies in fuel delivery that prevent a catalytic muffler (if present) from performing properly. Current carburetion designs may pass current certification requirements (i.e., high speed, full throttle) but may not pass future certification requirements that consider varying loads and speeds. This will be especially true when the emission levels require a catalytic muffler to meet the standards. Current carburetor and adapter designs still use a common inlet for multi-barrel carburetors and adapters. This prevents each cylinder from receiving a precise amount of fuel needed to minimize emission levels.

A problem with conventional carburetor systems is the uneven distribution of fuel to the cylinders. U.S. Pat. No. 3,843,338 to Zonker et al. describes a fuel metering chamber that merely acts as a reservoir of fuel. The Zonker et al. patent fuel metering chamber is open, allowing fuel to constantly flow through, with the fuel pressure and capacity changing constantly. Additionally, in the Zonker et al. patent the orifices coupled to the fuel metering chamber are of identical size therefore drawing the same volume of fuel. Likewise, a Honda GX670 LP-NG carburetor has a fuel bowl (i.e., a fuel metering device) that also acts as a reservoir for fuel. However, the Honda fuel bowl has a final orifice restriction between the fuel regulator and the fuel bowl, which does not allow for fuel expansion within the fuel bowl. Neither of the prior art devices addresses the uneven distribution of fuel to the cylinders.

What is needed in the art is a device that evenly distributes fuel to each cylinder.

SUMMARY

The following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. Its sole purpose is to present some concepts of the present disclosure in a simplified form as a prelude to the more detailed description that is presented herein.

A fuel bowl is disclosed. The fuel bowl comprises a body having an interior opposite an exterior, four sides, and a bottom opposite at least one opening. The at least one opening is configured to be in fluid communication with a carburetor or an adaptor. The fuel bowl also comprises at least one fuel inlet port disposed in at least one of the four sides and configured to receive a gaseous fuel from a fuel regulator. The gaseous fuel expands and contracts within the body. A carburetor system is also disclosed. The carburetor system comprises a gaseous fuel, a fuel regulator configured to receive and deliver the gaseous fuel, a fuel bowl in fluid communication with the fuel regulator and a carburetor, a final fuel metering restriction disposed in an inlet supply port of a cylinder of the carburetor, and a venturi disposed in the carburetor.

A fuel bowl is disclosed. The fuel bowl comprises a body having an interior and an exterior opposite the interior, a first side opposite a second side, a third side opposite a fourth side, and a bottom opposite at least one opening. The at least one opening is configured to be in fluid communication with at least one of a carburetor and an adaptor. The fuel bowl also comprises at least one fuel inlet port disposed in at least one of the first side, the second side, the third side, and the fourth side of the body. The at least one fuel inlet port is configured to receive a gaseous fuel from a fuel regulator. The gaseous fuel expands and contracts within said body.

A carburetor system is also disclosed. The carburetor system comprises a gaseous fuel and a fuel regulator configured to receive and deliver the gaseous fuel. The carburetor system also comprises a fuel bowl in fluid communication with the fuel regulator. The fuel bowl includes a body having an interior and an exterior opposite the interior, a first side opposite a second side, a third side opposite a fourth side, and a bottom opposite at least one opening. The at least one opening is configured to be in fluid communication with a carburetor and at least one fuel inlet port disposed in at least one of the first side, the second side, the third side, and the fourth side of the body. The at least one fuel inlet port is configured to receive the gaseous fuel from the fuel regulator. The gaseous fuel expands and contracts within the body. The carburetor system also comprises a final fuel metering restriction disposed in at least one inlet supply port of at least one cylinder of the carburetor. The final fuel metering restriction is in fluid communication with the fuel bowl. The carburetor system also comprises a venturi disposed in the carburetor. The venturi includes a restriction configured to draw the gaseous fuel into the carburetion system, mix the gaseous fuel with air and discharge a fuel air mixture for combustion, wherein the restriction includes a restriction diameter. The venturi includes an air inlet coupled within the restriction, such that the air inlet is configured to reduce a flow area from an air inlet first end to an air inlet second end. The venturi includes a fuel air outlet coupled within the restriction, such that the fuel air outlet is configured to increase the flow area from a fuel air outlet first end to a fuel air outlet second end. The fuel air outlet first end proximate the air inlet second end. The venturi includes a throat coupled within the restriction between the air inlet second end and the fuel air outlet first end. The venturi also includes a gaseous fuel supply passage in fluid communication within the restriction and proximate the throat, wherein the gaseous fuel supply passage is located between the air inlet first end and the fuel air outlet second end from about 40 percent to about 55 percent of the length measured from the fuel air outlet second end. The venturi includes a length comprising a distance from the air inlet first end to the fuel air outlet second end and a ratio between the restriction diameter and the length comprising at most 1.38 to 1. The air inlet and the gaseous fuel supply passage are configured as one of the air inlet having a radius with the gaseous fuel supply passage formed as slots. The air inlet has a radius with the gaseous fuel supply passage formed as bores, and the air inlet having a taper with the gaseous fuel supply passage formed as slots.

BRIEF DESCRIPTION OF THE FIGURES

Referring now to the figures, wherein like elements are numbered alike:

FIG. 9 is an illustration of an exemplary carburetion system;

FIG. 10 is an illustration of an exemplary carburetion system;

FIG. 11 is an illustration of an exemplary carburetion system;

FIG. 12 is a cross-sectional illustration of an exemplary carburetion system;

FIG. 27 is an illustration of an exemplary carburetion system;

FIG. 28 is an illustration of an exemplary carburetion system;

DETAILED DESCRIPTION

Figure 1:
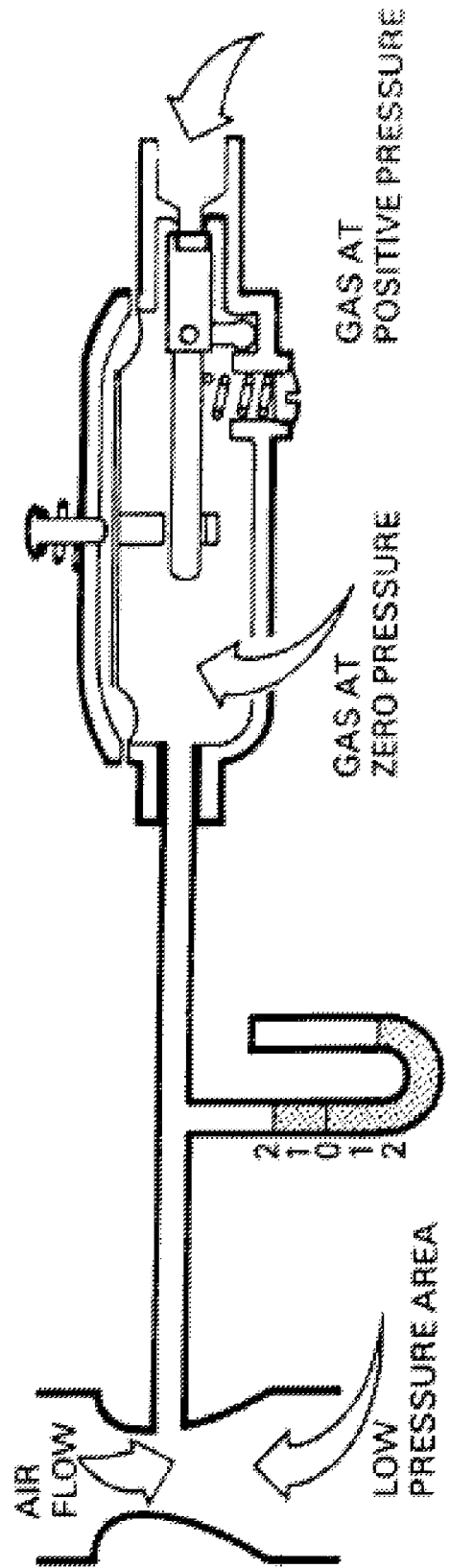
FIG. 1 is an illustration of a prior art carburetion system for gaseous fuel.

A venturi is a restriction in the engine's air intake that causes an increase in engine intake air velocity. As air passes the restriction and the restriction area enlarges, air velocity is reduced which creates a low-pressure area (i.e., vacuum) where a gaseous fuel may be introduced. The smaller the restriction for a given volume of air (i.e., venturi size) the more fuel is drawn into the engine. By changing the venturi size (for carburetor adapters and carburetors only) starting and horsepower can be enhanced as well as the consistency of fuel delivery levels at given RPM ranges.

The present invention addresses the power, emissions and application needs for venturi-type gaseous fuel carburetion. The present invention venturi designs, when used in adapters, have boosted power by about 5% to about 20% over conventional venturi styles. Carburetor/venturi combinations have produced even more power. In laboratory certification tests, these carburetion designs have exceeded comparable spud certified engines by delivering over about 40% more power and lower emissions. All of these benefits are attributed to improvements in airflow and fuel intake. The present invention produces cleaner emissions and better performance at varying speeds and loads compared with conventional fuel systems used on the same engine models. The present invention delivers fuel consistently throughout the engine's operating power curve. Consistent fuel delivery is not only important for power, but for proper management of emissions, especially when using a catalytic muffler. Central to the present invention is the venturi. While some features of the inventive venturi are shared with other venturis, the unique smoothness and shape of the inventive venturi produces novel improvements.

The following broadly describes four exemplary embodiments; a venturi with centered fuel inlet slots, with or without back cut for fuel slots, curved outside profile, with curved air inlet surface and specified diameter/length ratio; a venturi with centered fuel holes, with or without back cut for fuel holes, curved outside profile, with curved air inlet surface (diameter/length ratio not critical provided that air inlet curve is present); a venturi with centered fuel slots, with or without back cut for fuel slots, curved outside profile, with straight air inlet; and a venturi with variable centered slot location, within specified diameter/length ratio, adjusting fuel outlet wall angle and outlet diameter for carburetor throttle bore matching.

In an exemplary embodiment, the venturi can be defined as the complete restriction in a carburetion system designed to draw fuel into the carburetion system to mix the fuel with air for the purpose of combustion. In other embodiments, the venturi can include a variety of designs that allow for removal and insertion of portions of the venturi into existing carburetors or carburetor conversion adapters. Although most removable venturis contain the complete restriction, it is possible to include part or all of a non-removable venturi into the design of a carburetor, or carburetor adapter. In exemplary embodiments, a "shorter" removable venturi portion may be added to a fixed venturi portion to complete the venturi function. The venturi can be made up of a complete venturi form, in a fixed non-removable assembly that contains an outer wall formed into the carburetor body, a completely removable assembly and assemblies with part or portions that our removable.

Figure 2:
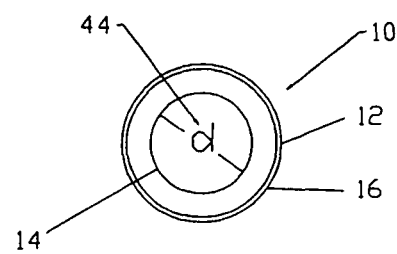
FIG. 2 is a top view of an exemplary embodiment of a venturi section.
Figure 3:
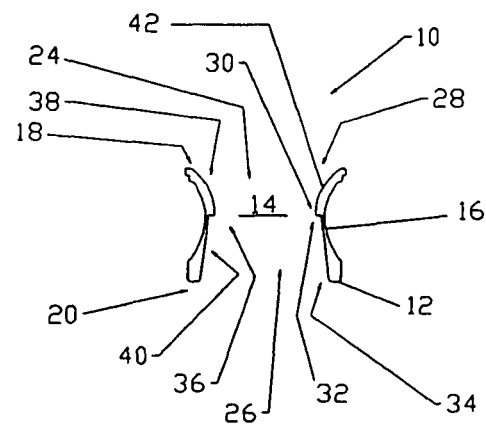
FIG. 3 is a cross-sectional view of an exemplary embodiment of a venturi section.
Figure 4:
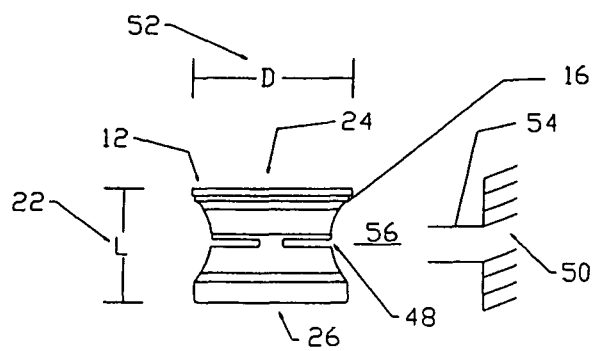
FIG. 4 is a side view of an exemplary embodiment of a venturi section.
Figure 5:
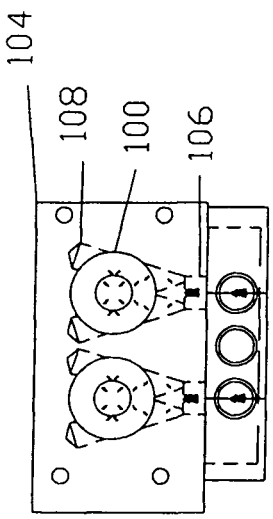
FIG. 5 is an illustration of an exemplary carburetion system.
Figure 7:
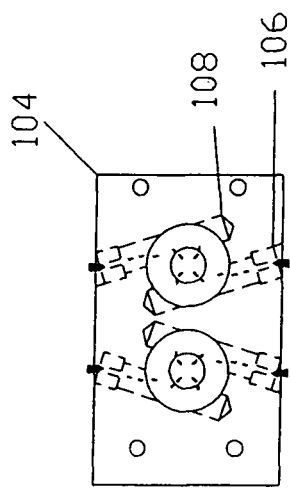
FIG. 7 is an illustration of an exemplary carburetion system.
Figure 6:
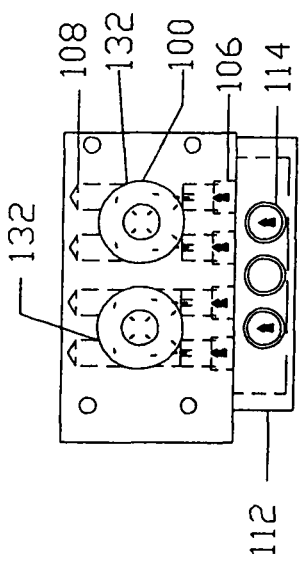
FIG. 6 is an illustration of an exemplary carburetion system.
Figure 8:
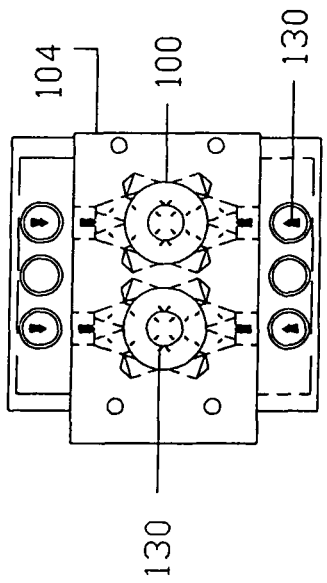
FIG. 8 is an illustration of an exemplary carburetion system.

Referring to FIGS. 2-4, an exemplary venturi section is illustrated in a top view, cross-sectional side view and a side view, respectively. The venturi 10 includes a venturi body 12, a throat 14 of a specified size diameter d, and of variable length, and venturi outer wall 16. The venturi outer wall 16 extends from a venturi first end 18 to a venturi second end 20. A venturi length 22 can be defined by a dimension L. The dimension, L is measured from the venturi first end 18 to the venturi second end, 20 near the carburetor throttle bore 60 (see FIGS. 10 and 12).

The venturi body 12 can comprise an air inlet portion 24 and a fuel air outlet portion 26 with the throat 14 formed between the air inlet portion 24 and the fuel air outlet portion 26. The air inlet portion 24 includes an air inlet first end 28 and an air inlet second end 30. The fuel air outlet portion 26 includes a fuel air outlet first end 32 and a fuel air outlet second end 34. The air inlet second end 30 is near the fuel air outlet first end 32. Throat 14 begins at the air inlet second end 30 and ends at the fuel air outlet first end 32. A venturi inner wall 36 comprises an air inlet inner wall 38, the throat 14 and a fuel air outlet inner wall 40. The venturi inner wall 36 extends substantially from the venturi first end 18 to the venturi second end 20. The air inlet inner wall 38 extends substantially from the air inlet first end 28 to the air inlet second end 30. The fuel air outlet inner wall extends substantially from the fuel air outlet first end 32 to the fuel air outlet second end 34.

The air inlet portion 24 is configured to reduce the area of air flow to throat 14 from the air inlet first end 28 to the air inlet second end 30. As a result, air entering the air inlet first end 28 is accelerated through throat 14 as a result of decreasing flow area. In an exemplary embodiment, the air inlet portion 24 includes a convex radius or taper 42 in the axial direction (airflow path) between the air inlet first end 28 (larger inside diameter) to the air inlet second end 30 (smaller inside diameter). Air entering venturi 10 can be gradually forced into a smaller flow area after entering the air inlet portion 24 as a result of the shape of the radius or taper 42. The air inlet portion 24 can be integral with the throat 14 and fuel air outlet portion 26. The air inlet portion 24 can be disconnected and separable from the throat 14 and the fuel air outlet portion 26.

The throat 14 is located adjacent the air inlet portion 24 proximate the air inlet second end 30 and located adjacent the fuel air outlet portion 26 proximate the fuel air outlet first end 32. The throat 14 includes a throat diameter 44 that is defined by a dimension d at the narrowest diameter of the throat 14. The throat 14 is configured to accelerate the air flowing through the venturi body 12, such that the accelerated airflow creates low air pressure in the venturi body 12 near the throat 14. The low-pressure air can be used to draw fuel into the fuel air outlet portion 26 from an exterior 46 of the venturi outer wall 16 as a result of a pressure difference between the air pressure at the throat 14 and the exterior 46. Fuel is introduced into the fuel air outlet portion 26 at a point just beyond fuel air outlet first end 32, near throat 14.

A fuel supply passage 48 is formed in the venturi body 12 through the venturi body 12 at a location proximate the throat 14. The fuel supply passage 48 can be configured as a slot(s) or as a hole(s) (bores) in the venturi body 12. The fuel supply passage 48 extends from the fuel air outlet inner wall 40 to the exterior 46 of the venturi outer wall 16. The fuel supply passage 48 is configured to fluidly couple a fuel source 50 with the fuel air outlet inner wall 40 of the venturi 10. Fluidly coupling can be defined as allowing a fluid material to connect (couple) in a given volume, to facilitate mass flow of the fluid, heat transfer through the fluid and transfer pressure forces through the fluid. The fuel source can be a fuel outlet 54 discharging near the exterior 46 and being supplied from a remote fuel source (not shown). In a preferred embodiment, the fuel source 50 can comprise a gaseous fuel, such as natural gas, propane, methane, hydrogen and the like, being supplied through a fuel demand type regulator to a carburetor or carburetor adapter. A carburetor typically contains one or more throttle value plate(s) (i.e., butterfly) with a device for adjusting throttle valve plate(s) and that mounts on the engine block or on the intake manifold. A carburetor adaptor contains one or more venturis and mounts between the air source and an existing carburetor body, and utilizes the throttle valve plate of the existing carburetor.

A relationship between a restriction diameter 52, shown as dimension D, and the venturi length 22 can be defined as a restriction diameter to venturi length ratio (diameter to length ratio). The diameter to length ratio describes the relationship between two of the venturi 10 dimensions that can influence the performance of the venturi 10. In a preferred embodiment, the ratio between the restriction diameter 52 and the venturi length 22 is below about 1.38 to 1 (1.38:1) and locates the fuel supply passage 48 center line between 40% and 55% of the venturi length 22, dimension L, when measured from the fuel air outlet second end 34. The exterior 46 space is formed by a concave radius. The fuel supply passage 48 center line location, in conjunction with the diameter to length ratio, is employed to maximize power and lower emissions in an internal combustion engine (not shown) coupled to the venturi 10 through a carburetor or carburetor adapter. The air inlet and fuel supply passage are configured as one of the following; the air inlet having a radius with the fuel supply passage formed as slots, the air inlet having a radius with the fuel supply passage formed as bores, and the air inlet having a taper with the fuel supply passage formed as slots.

Referring now to FIG. 5-11, in an embodiment of the carburetion system, the venturi 100 is contained within one of a carburetor 102 and a carburetor adapter 104 for the conveyance of fuel 130 from a fuel regulator (not pictured) to the venturi 100.

In an embodiment of the carburetion system, more than one venturi 100 is present in the carburetor 102 and the carburetor adapter 104. Fuel 130 is supplied to the carburetor 102 and the carburetor adapter 104 through a fuel regulator, upstream from carburetor 102 and carburetor adapter 104, and having a single demand type diaphragm and fuel valve (not shown). The carburetor 102 and the carburetor adapter 104 comprise at least one fuel supply port 106 for each venturi 100.

In another embodiment illustrated in FIGS. 5-11, the carburetor 102 and the carburetor adapter 104 comprises fuel port(s) 106 with extended passage(s) 108. The fuel port(s) 106 connects and supply fuel 130 to the venturi exterior 110. The length extends beyond the venturi 100. The extended passage 108 comprises a length that extends beyond the intersection 132 wherein extended passage 108 connects to venturi exterior 110.

As illustrated in FIGS. 5-11, in an embodiment, the carburetor 102 and the carburetor adapter 104 comprise fuel bowl 112. Fuel 130 is supplied to the carburetor 102 and carburetor adapter 104 fuel supply port(s) 106. Fuel bowl 112 has one of a single fuel inlet port 114 and multiple fuel inlet port 114 to the fuel bowl 112.

Referring now to FIGS. 5-11, 29 and 30, the fuel bowl 112 is a device that can be used with a multiple-cylinder gaseous fuel carburetor (carburetor) 102, or multiple-cylinder gaseous fuel carburetor adapter (adapter) 104. In operation, the carburetor 102 or adapter 104 receives fuel from a gaseous fuel regulator (regulator) 113 through a fuel inlet 114 in the fuel bowl 112. The fuel bowl 112 is located between the regulator fuel outlet 115 and the fuel supply ports 106 of the carburetor 102 or adapter 104. Gaseous fuel received from the regulator 113 is permitted to expand and contract in the fuel bowl 112, so that each individual fuel supply port 106 of the cylinders of the carburetor 102, may receive a more consistent supply of gaseous fuel from the fuel regulator 113.

The fuel bowl 112 has a body 117 having an interior 119, an exterior 121, a first side 123, a second side 125, a third side 127, a fourth side 129, and a bottom 131. The interior 119 contains a volume of space for receiving a gaseous fuel. The fuel bowl 112 interior 119 space is in fluid communication with fuel outlet 115 of the regulator 113 through a hose (or piping, and the like) 133. Although a rectangular shape is illustrated, the fuel bowl 112 can be any shape, including but not limited to, cubical, cylindrical, spherical, and the like. Fuel from the regulator 113 enters the interior 119 space of the fuel bowl 112 through the fuel bowl fuel inlet port 114. The fuel bowl 112 is installed in close proximity to the carburetor 102 (or adapter 104) so that each fuel supply port 106 of the carburetor 102 is in fluid communication with the interior 119 of the fuel bowl 112. Each carburetor 102 fuel supply port 106 contains a final fuel metering restriction 135 that controls the flow of gaseous fuel to each individual cylinder, through each cylinder's individual venturi 100, under a given pressure from the fuel regulator 113. The final fuel metering restriction 135 can be any device capable of limiting flow to a specific volume or pressure to achieve a specific quantity of gaseous fuel being delivered to each cylinder.

Fluid communication between the fuel bowl 112 interior 119 and the carburetor 102 (or adapter 104) fuel supply ports 106 is provided by at least one opening 137 in the fuel bowl 112. The opening 137 can be similar in size to the bottom 131 (see FIG. 29) or it can be smaller disposed within a top 139 of the fuel bowl 112 so that piping 141 can be utilized to connect with the fuel supply ports 106 (see FIG. 30). The opening 137 allows for fluid communication between the carburetor 102 (or adapter 104) fuel supply ports 106 and the interior 119 of the fuel bowl 112. Once installed and operational, the fuel bowl 112 becomes part of an integral, sealed fuel supply system between the regulator 113 and the carburetor 102 (or adapter 104). When installed and operational, the fuel bowl 112 interior 119 is not accessible from the outside.

Inconsistencies in the regulator's 113 fuel delivery can be minimized when a fuel bowl 112, of proper capacity, is present. Without a fuel bowl 112, irregular vacuum impulses from the engine to the fuel regulator's 113 diaphragm (not shown) create inconsistencies in fuel delivery to each cylinder's fuel supply port(s) 106. Each final fuel metering restriction (or cylinder's orifice) 135 will therefore, not receive the correct volume of fuel at the correct delivery pressure, resulting in variance in engine power and emissions.

The fuel bowl 112 allows the fuel to expand and contract before fuel is delivered to each cylinder's fuel supply port(s) 106 so that the fuel, available to each cylinder, is more consistent under varying operational conditions. As a result, the fuel bowl 112 creates a more even distribution of fuel supplied to each cylinder, compensating for the fuel regulator 113 delivery inconsistencies. The increased consistency in fuel delivery, provided by the fuel bowl 112, permits the use of individually sized orifices (or final fuel metering restrictions 135), located in each cylinder's fuel supply port 106, controlling the actual flow of fuel to each individual cylinder, through the venturi 100, thus maximizing each cylinder's potential power and emissions.

The fuel bowl 112, the final fuel metering restriction 135 to each individual cylinder's fuel supply port 106 and the venturi 100 size of each carburetor 102 (or adapter 104), work together to control how the fuel, supplied from the regulator 113, is drawn into the engine.

As a result, the fuel bowl capacity (interior space), and the amount of fuel contained within the fuel bowl 112 at any given moment, depend on the engine's displacement, the venturi 100 sizing, the carburetor 102 (or adapter 104) inlet supply restriction size for each individual cylinder, the operating conditions and the fuel regulator's output pressure. The fuel bowl 112 contains no moving parts that would alter the amount of fuel contained within the fuel bowl 112. The fuel bowl capacity is to be determined by its relationship to these other elements within a complete carburetion system. A fuel bowl 112 that is too large may accumulate excess fuel, so that the engine may run too rich under some operating conditions. If the fuel bowl capacity is too small, the fuel contained within the fuel bowl 112, may not have sufficient space to expand and contract, so as to provide a more consistent delivery of fuel to each cylinder.

In a preferred embodiment of the fuel bowl 112, the fuel bowl 112 is a removable device that permits the exchanging of fuel bowl capacities. It is contemplated that multiple fuel bowls 112 can be utilized with a carburetor or adapter. However, the fuel bowl 112 may also be permanently designed into a carburetor 102 (or adapter 104) design, performing the same functions as a removable fuel bowl 112.

The gaseous fuel bowl 112 can be installed in conjunction with the venturi 100 to address the problem of uneven fuel delivery caused by a fuel regulator 113. Additionally, the use of the gaseous fuel bowl 112 reduces the need for external fuel supply hoses and fittings. Only a single hose 133 is needed from the fuel regulator to the carburetor 102 or the carburetor adapter 104. The gaseous fuel bowl 112 provides a place for the fuel to expand and contract before being drawn into the fuel supply port 106 of the carburetor 102 or the carburetor adapter 104.

The gaseous fuel bowl 112 is unlike a conventional gasoline fuel bowl since its function is equalization, not merely storage. Gasoline, in a gasoline carburetor bowl, is held in check by gravity and must be vented to atmosphere. In contrast, the gaseous fuel bowl 112 must be a non-vented container and the fuel is allowed to expand and contract as each cylinder draws fuel from within the gaseous fuel bowl 112. The result of using a gaseous fuel bowl 112 is a more even distribution of fuel supplied to each cylinder compensating for the fuel regulator 113 delivery inconsistencies.

A gaseous fuel bowl 112 offers several other advantages. The gaseous fuel bowl 112 has no need for a tee to distribute fuel individually to each cylinder's fuel inlet port. When using a gaseous fuel bowl 112, fuel supply port 106 can draw freely and equally from the gaseous fuel bowl 112. In another embodiment, each fuel supply port 106 can draw freely and equally from the gaseous fuel bowl 112 using one of orifice(s) that can be installed in each cylinder's fuel supply port 106 within the gaseous fuel bowl 112 for very precise metering, and orifice(s) connected to fuel bowl 112 fuel inlet port(s) 114 for very precise metering.

As illustrated in FIG. 12, the distance 118, shown as dimension L1, specifies a length between the carburetor throttle shaft centerline 116 of the carburetor 102, and the venturi fuel supply passage 120. The distance 122, shown as dimension L2, specifies a length between the carburetor throttle shaft centerline 116 of the carburetor 102 and the venturi fuel air outlet second end 124 near the throttle bore 60. The throttle shaft to venturi ratio is defined as a relationship between distance 118 when divided by the distance 122. The throttle shaft to venturi ratio describes the relationship between two of the carburetor 102 dimensions that can influence the performance of the carburetor system. In a preferred embodiment, the ratio between distance 118 and distance 122 is below about 1.6 to 1(1.6:1). This ratio reflects an optimal spacing between carburetor throttle shaft centerline 116, and venturi 100, resulting in improvements in fuel delivery and airflow patterns within carburetor 102. This ratio defines an optimal spacing relationship between the venturi 100 and the throttle shaft, so that the disruption to the airflow within the venturi 100, caused by the presence of a throttle shaft, is minimized, resulting in improved fuel air mixing within the venturi area. Improved fuel air mixing within the venturi 100 improves fuel air delivery to the engine throughout the entire operating range of the engine, thus producing more power with lower emissions.

Figure 13:
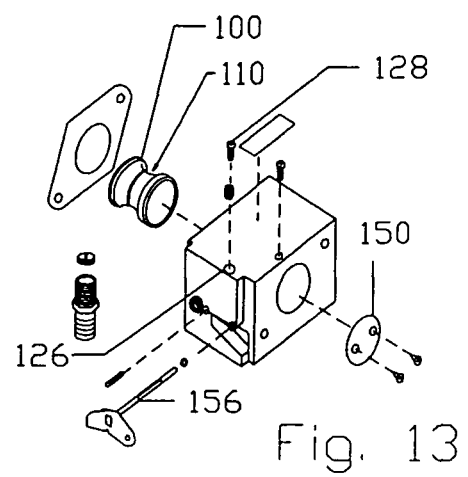
FIG. 13 is an exploded view illustration of an exemplary carburetion system.
Figure 14:
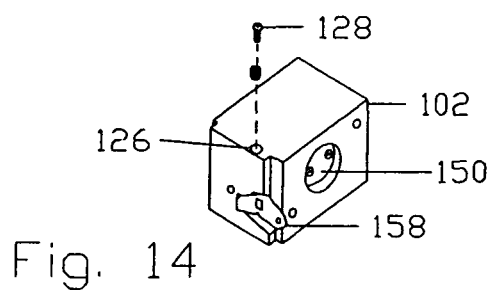
FIG. 14 is a perspective view illustration of an exemplary carburetion system.
Figure 15:
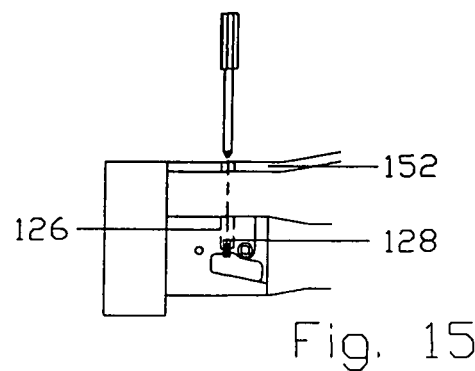
FIG. 15 is an illustration of an exemplary carburetion system.
Figure 16:
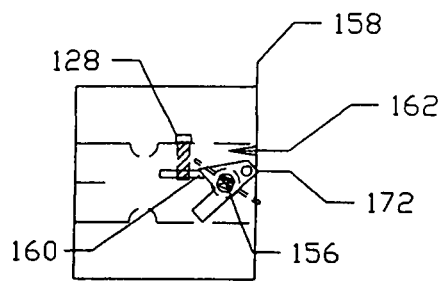
FIG. 16 is an illustration of an exemplary throttle lever configuration.
Figure 17:
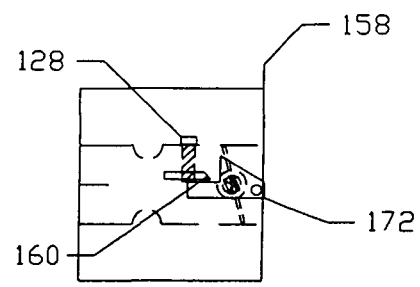
FIG. 17 is an illustration of an exemplary throttle lever configuration.
Figure 18:
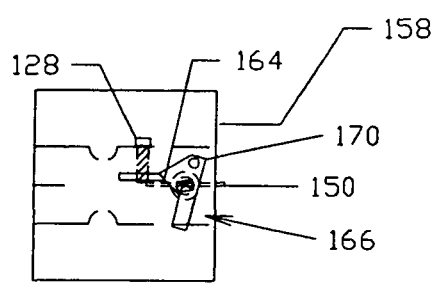
FIG. 18 is an illustration of an exemplary throttle lever configuration.
Figure 19:
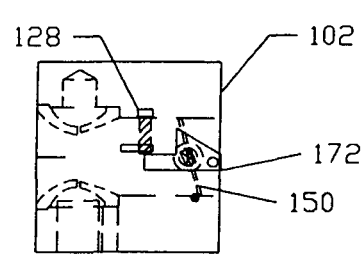
FIG. 19 is an illustration of an exemplary carburetion system.
Figure 20:
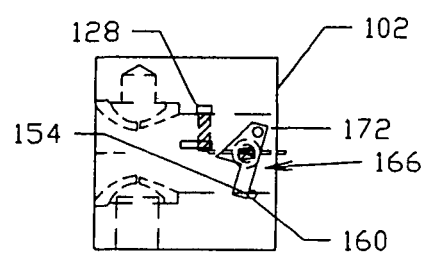
FIG. 20 is an illustration of an exemplary carburetion system.
Figure 21:
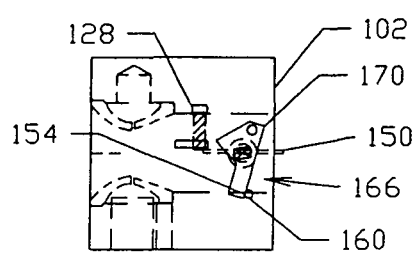
FIG. 21 is an illustration of an exemplary carburetion system.
Figure 22:
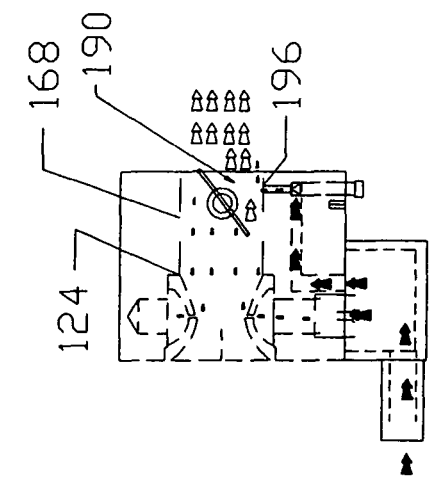
FIG. 22 is an illustration of an exemplary carburetion system.
Figure 23:
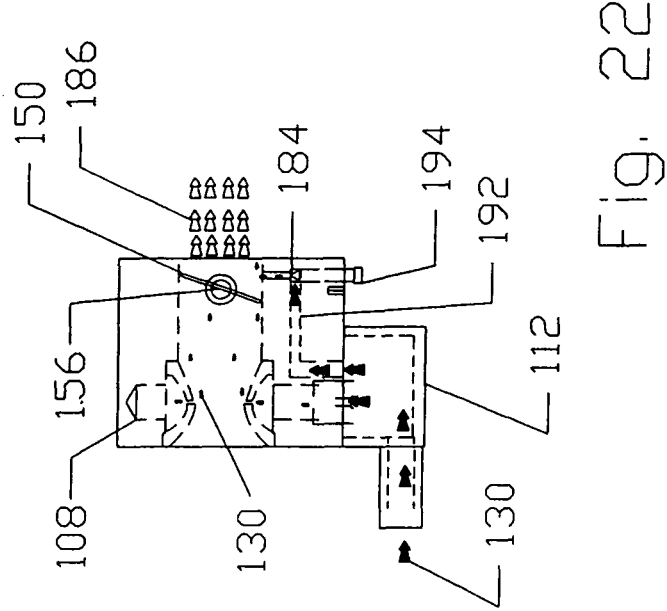
FIG. 23 is an illustration of an exemplary carburetion system.
Figure 26:
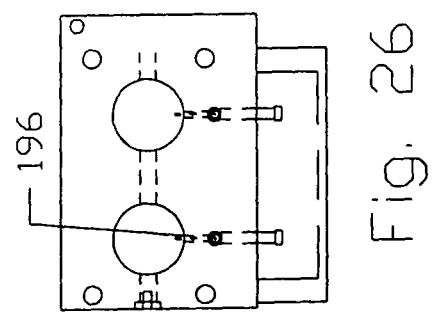
FIG. 26 is an illustration of an exemplary carburetion system.
Figure 25:
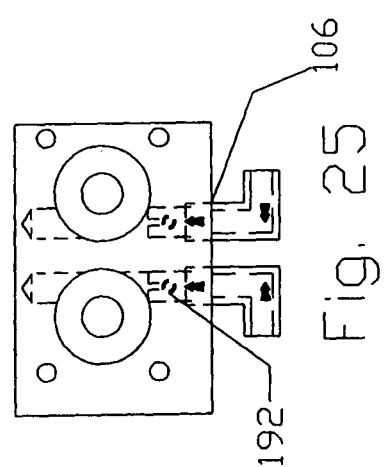
FIG. 25 is an illustration of an exemplary carburetion system.
Figure 24:
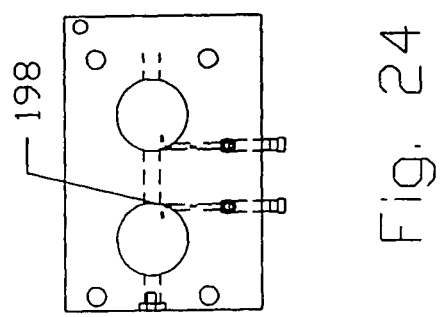
FIG. 24 is an illustration of an exemplary carburetion system.
Figure 29:
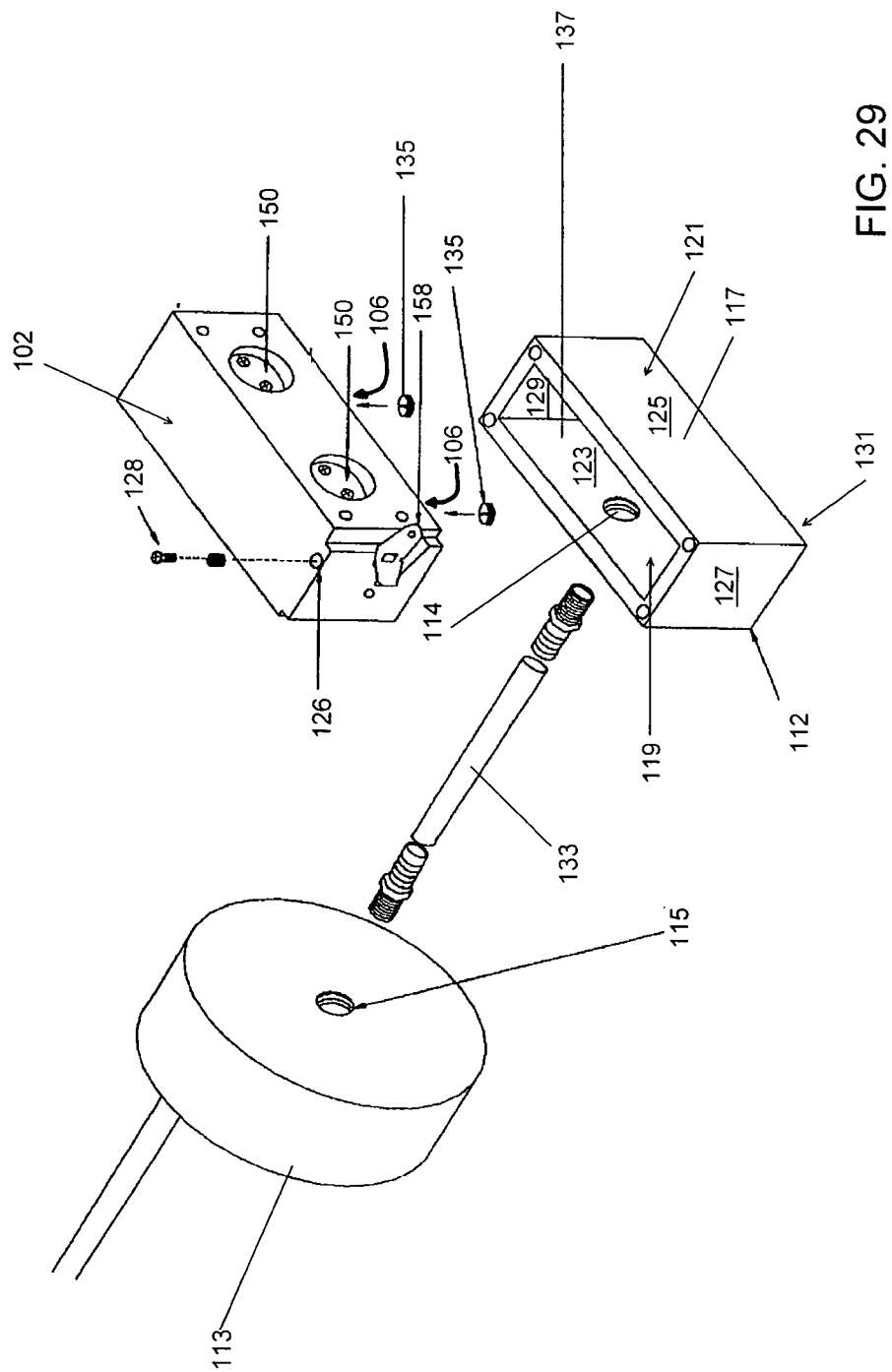
FIG. 29 is an illustration of an exemplary carburetor system including a fuel bowl coupled directly to the carburetor.
Figure 30:
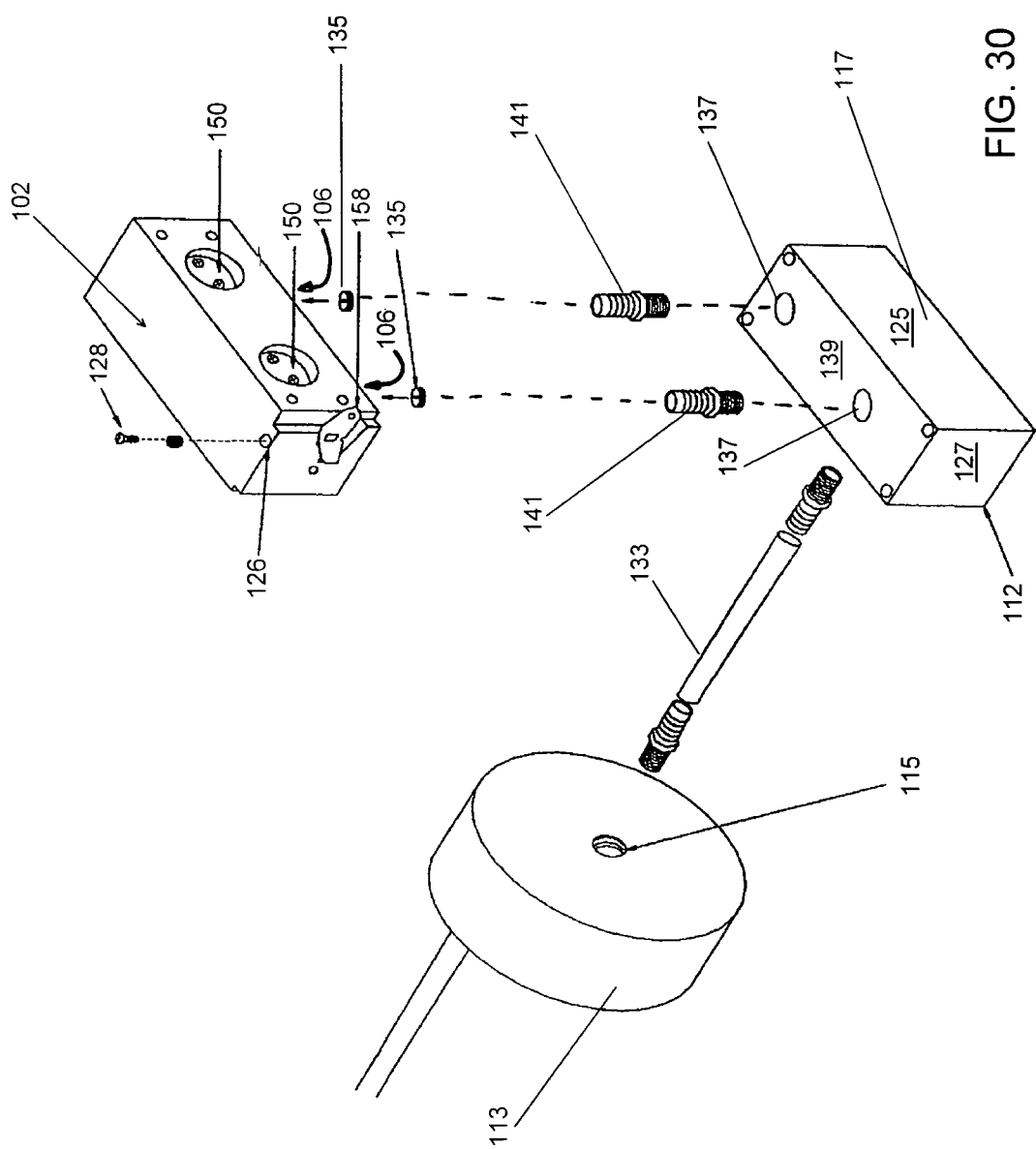
FIG. 30 is an illustration of an exemplary carburetor system including a fuel bowl coupled to the carburetor via piping.

In an embodiment illustrated in FIGS. 13-15, the carburetor 102 comprises an idle adjustment hole 126, where an engine idle adjustment device 128 is located. In many modern engines, the carburetor is placed under an engine shroud. This prevents visual access to the engine idle adjustment device. The engine idle adjustment device 128 is used to adjust the stopping position of throttle valve plate 150 contained within carburetor 102. The idle adjustment hole 126 provides a means for more easily locating the idle adjustment device 128, when the view of its location is obscured by an obstacle, such as an engine shroud 152.

Airflow through a typical carburetor body 158 is controlled by the rotation of the throttle valve plate 150 when attached to a throttle shaft 156. The amount of throttle shaft 156 rotation is determined by limits designed into one of a full open throttle lever 170 or a partial open throttle lever 172. Both levers strike the idle adjustment device 128 and full throttle stop 160 to determine rotation amount. Full open throttle lever 170 is configured to provide full throttle opening 166. Partial open throttle lever 172 is configured to provide partial throttle opening 162. The difference between the full open throttle lever 170 and the partial open throttle lever 172 is the configuration of maximum throttle strike point 164.

In an embodiment of the carburetor 102 illustrated in FIGS. 16-21, the carburetor 102 can be configured to achieve full throttle opening 166 when using one of full open throttle lever 170 and partial open throttle lever 172. In this embodiment, the full throttle stop 160 is moved so that full throttle stop 160 strikes the throttle lever at an alternative throttle strike point 154 common to both full open throttle lever 170 and partial open throttle lever 172.

In an embodiment of the carburetor 102 illustrated in FIGS. 22-28, each throttle valve chamber 168 present in carburetor 102 contains an idle circuit 184 comprising one idle fuel port 192 and an idle adjustment 194. Idle fuel port 192 is supplied fuel 130 by one of extended passage 108, venturi exterior 110, fuel supply port 106, and fuel bowl 112. Idle circuit outlet 196 of idle circuit 184 is fluidly coupled to throttle valve chamber 168. Idle circuit outlet 196 is located proximate the engine side of throttle valve plate 150. The engine side of the throttle valve plate 150 is exposed to an area of increased vacuum 190, when compared with an area of lower vacuum 186 on the opposite side of the throttle valve plate 150. This area of increased vacuum 190 is the result of the closure or the partial closure of the throttle valve plate 150. Increased area of vacuum 190 will exist to some extent until throttle valve plate 150 is fully opened and the vacuum 186 equalizes between the venturi outlet second end 124 and the throttle valve chamber 168. When the idle circuit 184 is located opposite 188 of the area of increased vacuum 190, idle circuit outlet 196 has an alternative idle circuit outlet 198 location proximate throttle shaft 156 and proximate the engine side of the throttle valve plate 150 (i.e., an area of increased vacuum 190).

While the present invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel bowl comprising:
   a body having an interior and an exterior opposite said interior, a first side opposite a second side, a third side opposite a fourth side, and a bottom opposite at least one opening, said at least one opening configured to be in fluid communication with at least one of a carburetor and an adaptor; and
   at least one fuel inlet port disposed in at least one of said first side, said second side, said third side, said fourth side, said bottom, and said at least one opening of said body, said at least one fuel inlet port configured to receive a gaseous fuel from a fuel regulator, wherein said gaseous fuel expands and contracts within said body,
   wherein the fuel bowl is a non-vented container when coupled to and in fluid communication with a venturi and at least one final fuel metering restriction device of at least one of said carburetor and said adaptor, wherein the venturi and the at least one final fuel metering restriction device are configured to cooperate with each other, wherein the venturi includes a restriction diameter and a venturi length and wherein the ratio between the restriction diameter and the venturi length is equal to or below 1.38:1, and
   wherein the fuel bowl is configured to deliver and evenly distribute the gaseous fuel from the fuel bowl to multiple cylinders.

2. The fuel bowl of claim 1, further comprising:
   a top disposed opposite said bottom and coupled to said body, wherein said at least one opening is disposed in said top.

3. The fuel bowl of claim 2, further comprising
   piping disposed in said at least one opening to allow fluid communication with at least one of said carburetor and said adaptor, wherein said piping completely occupies said at least one opening.

4. The fuel bowl of claim 1, wherein said gaseous fuel occupies said interior of said body.

5. The fuel bowl of claim 1, further comprising:
   piping coupled between said at least one fuel inlet port and said fuel regulator.

6. The fuel bowl of claim 1, wherein the fuel bowl has no moving parts.

7. The fuel bowl of claim 1, wherein said fuel bowl has at least one of a rectangular shape, a cubical shape, a cylindrical shape, and a spherical shape.

8. A carburetor system comprising:
- a fuel regulator configured to receive and deliver a gaseous fuel;
- a fuel bowl in fluid communication with said fuel regulator, said fuel bowl including a body having an interior and an exterior opposite said interior, a first side opposite a second side, a third side opposite a fourth side, and a bottom opposite at least one opening, said at least one opening configured to be in fluid communication with at least one of a carburetor and an adaptor and at least one fuel inlet port disposed in at least one of said first side, said second side, said third side, said fourth side, said bottom, and said at least one opening of said body, said at least one fuel inlet port configured to receive said gaseous fuel from said fuel regulator, wherein said gaseous fuel expands and contracts within said body;
- a final fuel metering restriction device disposed in at least one inlet supply port of at least one cylinder of at least one of said carburetor and said adaptor, said final fuel metering restriction in fluid communication with said opening of said fuel bowl; and
- a venturi disposed in said carburetor, wherein said venturi includes a venturi length and said final fuel metering restriction device are configured to cooperate with each other, said venturi having
  - a restriction configured to draw said gaseous fuel into said carburetor system, mix said gaseous fuel with air and discharge a fuel air mixture for combustion, said restriction including a restriction diameter
  - an air inlet coupled within said restriction, said air inlet configured to reduce a flow area from an air inlet first end to an air inlet second end;
  - a fuel air outlet coupled within said restriction, said fuel air outlet configured to increase said flow area from a fuel air outlet first end to a fuel air outlet second end, said fuel air outlet first end proximate said air inlet second end;
  - a throat coupled within said restriction between said air inlet second end and said fuel air outlet first end;
  - a gaseous fuel supply passage in fluid communication within said restriction and proximate said throat, wherein said gaseous fuel supply passage is located between said air inlet first end and said fuel air outlet second end from 40 percent to 55 percent of said venturi length measured from said fuel air outlet second end;
  - wherein the venturi length comprises a distance from said air inlet first end to said fuel air outlet second end;
  - a ratio between said restriction diameter and said length comprising at most 1.38 to 1; and
  - wherein said air inlet and said gaseous fuel supply passage are configured as one of said air inlet having a radius with said gaseous fuel supply passage formed as slots, said air inlet having a radius with said gaseous fuel supply passage formed as bores, and said air inlet having a taper with said gaseous fuel supply passage formed as slots; and
  - wherein said fuel bowl is a non-vented container when coupled to and in fluid communication with at least one of said carburetor and said adaptor, and
  - wherein the fuel bowl is configured to deliver and evenly distribute the gaseous fuel from the fuel bowl to multiple cylinders.

9. The carburetor system of claim 8, further comprising:
- a throttle shaft coupled to said carburetor, said throttle shaft configured to actuate a throttle valve plate within said carburetor body.

10. The carburetor system of claim 9, wherein a first length between said throttle shaft and said fuel supply passage of said venturi is a first distance, and a second length between said throttle shaft and said fuel air outlet of said venturi is a second distance.

11. The carburetor system of claim 10, wherein a throttle shaft to venturi ratio is defined as said first distance divided by said second distance.

12. The carburetor system of claim 11, wherein said throttle shaft to venturi ratio is below 1.6 to 1.

13. The carburetor system of claim 8, further comprising:
- an idle adjustment hole disposed within said carburetor, said idle adjustment hole positioned to allow access to an engine idle adjustment device.

14. The carburetor system of claim 8, further comprising:
- a top disposed opposite said bottom and coupled to said body of said fuel bowl, wherein said at least one opening is disposed in said top.

15. The carburetor system of claim 8, further comprising piping disposed in said at least one opening of said fuel bowl to allow fluid communication with at least one of said carburetor and said adaptor, wherein said piping completely occupies said at least one opening.

16. The carburetor system of claim 8, wherein said gaseous fuel occupies said interior of said body of said fuel bowl.

17. The carburetor system of claim 8, further comprising:
- piping coupled between said fuel inlet port of said fuel bowl and said fuel regulator.

18. The carburetor system of claim 8, wherein said fuel bowl has at least one of a rectangular shape, a cubical shape, a cylindrical shape, and a spherical shape.

19. The carburetor system of claim 8, wherein said fuel bowl has no moving parts.

20. A fuel bowl comprising:
- a body having an interior and an exterior opposite said interior, at least one side defining said interior, and at least one opening, said at least one opening configured to be in fluid communication with at least one of a carburetor and an adaptor; and
- at least one fuel inlet port disposed in said at least one side of said body, said at least one fuel inlet port configured to receive a gaseous fuel from a fuel regulator, wherein said gaseous fuel expands and contracts within said body,
- wherein the fuel bowl is a non-vented container when coupled to and in fluid communication with a venturi and at least one final fuel metering restriction device of at least one of said carburetor and said adaptor, wherein the venturi and the at least one final fuel metering restriction device are configured to cooperate with each other, and
- wherein the fuel bowl is configured to deliver and evenly distribute the gaseous fuel from the fuel bowl to multiple cylinders.

21. The fuel bowl of claim 20, further comprising piping disposed in said at least one opening to allow fluid communication with at least one of said carburetor and said adaptor, wherein said piping completely occupies said at least one opening.

22. The fuel bowl of claim 20, wherein said gaseous fuel occupies said interior of said body.

23. The fuel bowl of claim 20, further comprising:
piping coupled between said at least one fuel inlet port and said fuel regulator.

24. The fuel bowl of claim 20, wherein the fuel bowl has no moving parts.

25. The fuel bowl of claim 20, wherein said fuel bowl has at least one of a rectangular shape, a cubical shape, a cylindrical shape, and a spherical shape.

26. A carburetor system comprising:
a fuel regulator configured to receive and deliver a gaseous fuel;
a body having an interior and an exterior opposite said interior, at least one side defining said interior, and at least one opening, said at least one opening configured to be in fluid communication with at least one of a carburetor and an adaptor, and at least one fuel inlet port disposed in said at least one side of said body, said at least one fuel inlet port configured to receive a gaseous fuel from a fuel regulator, wherein said gaseous fuel expands and contracts within said body;
a final fuel metering restriction device disposed in at least one inlet supply port of at least one cylinder of at least one of said carburetor and said adaptor, said final fuel metering restriction in fluid communication with said opening of said fuel bowl; and
a venturi disposed in said carburetor and having a venturi length, wherein said venturi and said final fuel metering restriction device are configured to cooperate with each other, said venturi having a restriction configured to draw said gaseous fuel into said carburetor system, mix said gaseous fuel with air and discharge a fuel air mixture for combustion, said restriction including a restriction diameter
an air inlet coupled within said restriction, said air inlet configured to reduce a flow area from an air inlet first end to an air inlet second end;
a fuel air outlet coupled within said restriction, said fuel air outlet configured to increase said flow area from a fuel air outlet first end to a fuel air outlet second end, said fuel air outlet first end proximate said air inlet second end;
a throat coupled within said restriction between said air inlet second end and said fuel air outlet first end;
a gaseous fuel supply passage in fluid communication within said restriction and proximate said throat, wherein said gaseous fuel supply passage is located between said air inlet first end and said fuel air outlet second end from 40 percent to 55 percent of said length measured from said fuel air outlet second end;
a wherein the venturi length comprises a distance from said air inlet first end to said fuel air outlet second end;
a ratio between said restriction diameter and said length comprising at most 1.38 to 1; and wherein said air inlet and said gaseous fuel supply passage are configured as one of said air inlet having a radius with said gaseous fuel supply passage formed as slots, said air inlet having a radius with said gaseous fuel supply passage formed as bores, and said air inlet having a taper with said gaseous fuel supply passage formed as slots; and
wherein said fuel bowl is a non-vented container when coupled to and in fluid communication with at least one of said carburetor and said adaptor, and
wherein the fuel bowl is configured to deliver and evenly distribute the gaseous fuel from the fuel bowl to multiple cylinders.

27. The carburetor system of claim 26, further comprising:
a throttle shaft coupled to said carburetor, said throttle shaft configured to actuate a throttle valve plate within said carburetor body.

28. The carburetor system of claim 27, wherein a first length between said throttle shaft and said fuel supply passage of said venturi is a first distance, and a second length between said throttle shaft and said fuel air outlet of said venturi is a second distance.

29. The carburetor system of claim 28, wherein a throttle shaft to venturi ratio is defined as said first distance divided by said second distance.

30. The carburetor system of claim 29, wherein said throttle shaft to venturi ratio is below 1.6 to 1.

31. The carburetor system of claim 26, further comprising:
an idle adjustment hole disposed within said carburetor, said idle adjustment hole positioned to allow access to an engine idle adjustment device.

32. The carburetor system of claim 26, further comprising:
a top disposed opposite said bottom and coupled to said body of said fuel bowl, wherein said at least one opening is disposed in said top.

33. The carburetor system of claim 26, further comprising piping disposed in said at least one opening of said fuel bowl to allow fluid communication with at least one of said carburetor and said adaptor, wherein said piping completely occupies said at least one opening.

34. The carburetor system of claim 26, wherein said gaseous fuel occupies said interior of said body of said fuel bowl.

35. The carburetor system of claim 26, further comprising:
piping coupled between said fuel inlet port of said fuel bowl and said fuel regulator.

36. The carburetor system of claim 26, wherein said fuel bowl has at least one of a rectangular shape, a cubical shape, a cylindrical shape, and a spherical shape.

37. The carburetor system of claim 26, wherein said fuel bowl has no moving parts.

* * * * *